H. M. Smith,
Potato Digger.

No. 94,356.   Patented Aug. 31, 1869.

Witnesses:
A. W. Almquist
O. Hinchman

Inventor:
H. M. Smith
per
M. Smith
Attorneys.

United States Patent Office.

H. M. SMITH, OF LONG BRANCH, NEW JERSEY.

Letters Patent No. 94,356, dated August 31, 1869.

IMPROVEMENT IN POTATO-DIGGER.

The Schedule referred to in these Letters Patent and making part of the same.

*To all whom it may concern:*

Be it known that I, H. M. SMITH, of Long Branch, in the county of Monmouth, and State of New Jersey, have invented a new and improved Potato-Digger and Picker; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
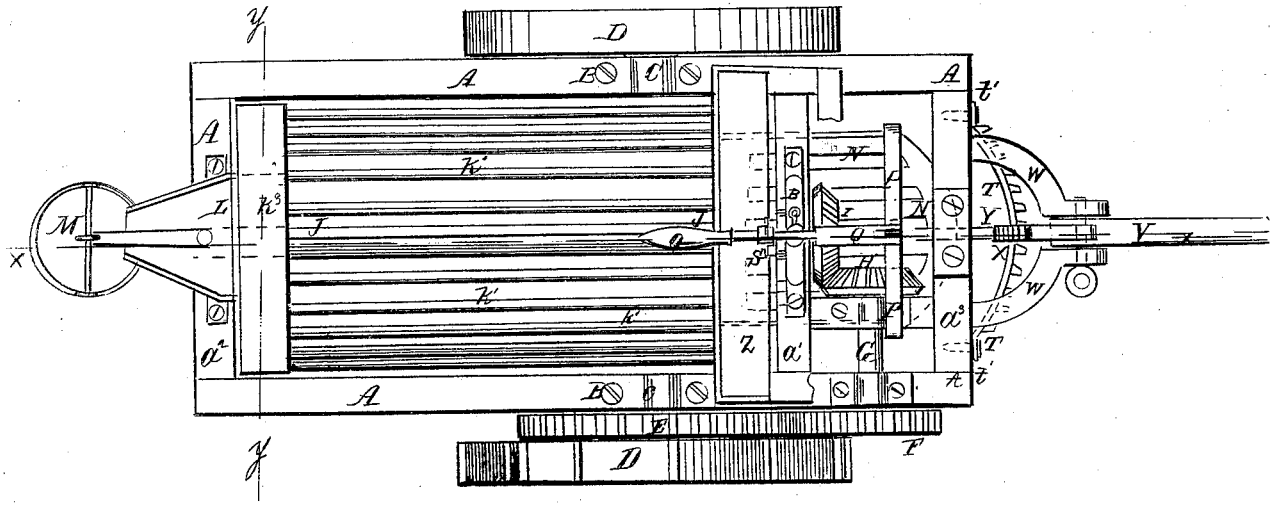
Figure 1 is a top or plan view of my improved potato-digger and picker.

My invention has for its object to furnish an improved potato-digger, which shall be strong, simple in construction, and effective in operation, and which shall, at the same time, screen the potatoes and deposit them in a basket or other receptacle, suspended at the rear of the machine; and It consists in the construction and combination of the various parts of the machine, as hereinafter more fully described.

A is the frame of the machine, to the side bars of which, a little in front of the middle part are attached brackets B, to which are securely and rigidly attached the inner ends of the axles C, upon which the wheels D revolve. This construction, by enabling me to dispense with a long axle, enables me to bring the revolving screen forward, so as to shorten the machine, and bring it into more convenient dimensions.

To one of the wheels D is securely attached, or upon it is formed a large gear-wheel, E, the teeth of which mesh into the teeth of a smaller gear-wheel, F, attached to the outer end of the shaft G, which revolves in bearings attached to the frame A.

To the inner end of the shaft G is attached a bevel-gear wheel, H, the teeth of which mesh into the teeth of the bevel-gear wheel I, attached to the forward end of the shaft J, which works in bearings attached to the middle parts of the cross-bars $a^1$ and $a^2$ of the frame A.

K is the screen, which is rigidly connected with the shaft J, so as to be carried with said shaft in its revolution.

The body of screen K is made cylindrical in form, and is formed of longitudinal tubes $k^1$, extending from end to end of the screen. By making the bars or rods $k^1$ tubular, I am enabled to make them sufficiently light, and, at the same time, of suitable size and strength.

The forward ends of the tubular bars $k^1$ are attached to an inwardly-projecting flange, formed upon the inner edge of the rim or band $k^2$, to which flange are also attached the arms or spokes, by means of which the forward end of the screen K is supported and connected with the shaft J.

The rear ends of the tubes $k^1$ are attached to an inwardly-projecting flange, formed upon the inner edge of the rim or band $k^3$, to which flange are also attached the ends of the arms or spokes, by which the rear end of the screen is supported and connected with the shaft J.

The rim or band $k^3$ is formed with another inwardly-projecting flange, $k^4$, which is made considerably deeper than the inner flange, so as to prevent the potatoes from escaping from the rear end of the screen, which should be enough lower than the forward end to cause the potatoes to roll back from the forward to the rear end of said screen, as it revolves, the soil that may have adhered to or been raised with said potatoes passing through the said screen and falling upon the ground.

Upon the inner end or concave surface of the band or rim $k^3$ are formed buckets $k^5$, which take up the potatoes and drop them into the spout or chute L, down which they flow to the basket M, or other receptacle prepared to receive them.

The basket M may be an ordinary basket, detachably suspended from brackets attached to the spout L, or to the frame of the machine.

The spout L should be attached to the frame of the machine, so as to remain stationary while the screen revolves.

The rear end of the machine may be supported by a caster-wheel or wheels, which should be made adjustable, so that a greater or less inclination may be given to the screen, as may be desired or necessary.

N is the plow-plate, scoop, or shovel, by which the potatoes and soil are raised from the ground, and which is made with flanged side edges, to prevent the potatoes from working off at its sides, and is slotted, as is shown in fig. 1, so that the loose soil may escape through said slots, while the potatoes and remaining soil pass up into the revolving screen K.

The rear end of the plow-plate N is pivoted to the lower ends of the bars or arms O, the upper ends of which are securely attached to the cross-bar $a^1$ of the frame A, in such positions that the rear end of the said plow-plate may guide the potatoes and soil into the screen K, and in such a manner that the forward end of the said plow-plate may be raised or lowered, according to the depth to which it is desired to have the said plow-plate enter the ground.

To the sides of the plow-plate N are pivoted the lower ends of the stirrup or connecting-bar P, the upper end or ends of which is or are pivoted to the end of the lever Q.

The lever Q is pivoted to a support, R, attached to the frame A, and its free end or handle passes through a guide-slot in the bar or post S, and is secured in place when adjusted by a pin passing through one or the other of the holes in the said slotted post, and through a hole in the said lever, so as to hold the plow-plate securely in place while at work.

The particular arrangement of the lever Q, and of the bar or bars by which it is connected with the plow-plate N, is entirely immaterial, and may be such that the said lever may have a vertical position, for convenience in operating it.

Figure 2:
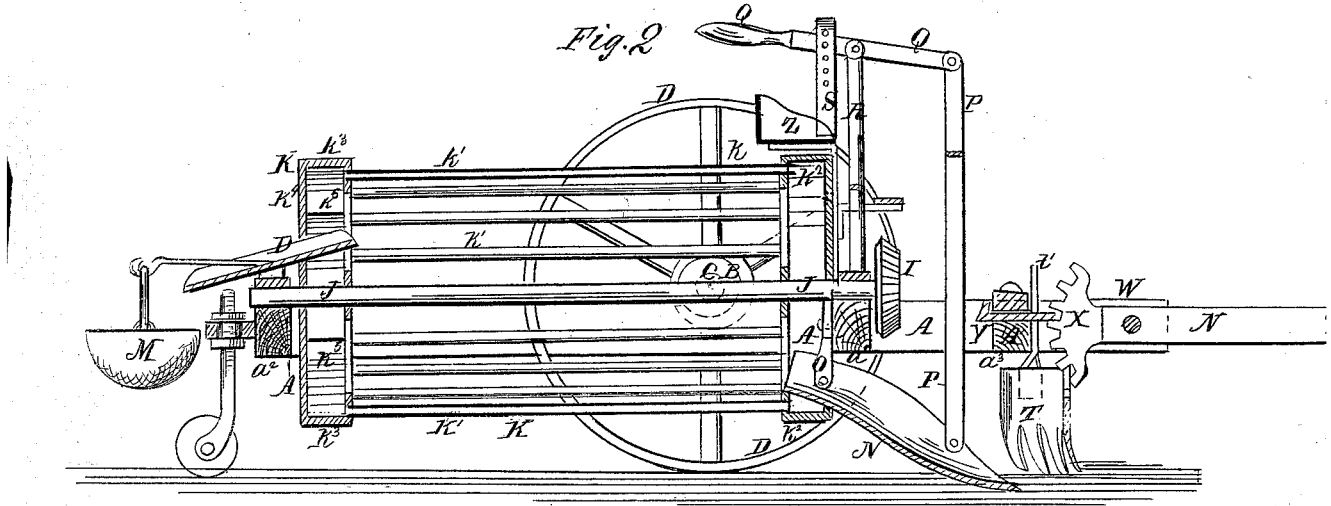
Figure 2 is a vertical longitudinal section of the same, taken through the line $x\ x$, fig. 1.
Figure 3:
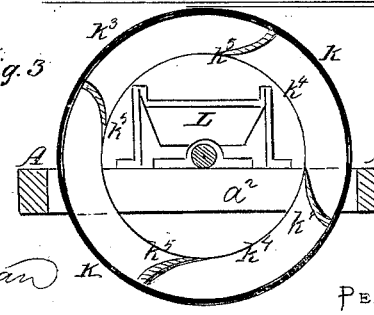
Figure 3 is a detail vertical cross-section of the same, taken through the line $y\ y$, fig. 1.

T is a scraper, which is a curved vertical plate slotted along its lower edge, as shown in figs. 1 and 2, to form prongs or tines, to remove the stalk, weeds, and other rubbish in front of the plow-plate N.

The scraper T is adjustably connected to the front cross-bar $a^3$ of the frame A, by means of screws or bolts passing through the slotted arms $t$, the lower ends of which are attached to the said scraper T, so that it may be adjusted in a higher or lower position, as the circumstances of the case may require.

V is the tongue, which is pivoted to and below the hounds W, which are attached to the front cross-bar $a^3$ of the frame A.

To the rear end of the tongue V is rigidly attached a curved rack, X, into the teeth of which enters the forward end of the key or stop Y, which passes through a hole in the front cross-bar $a^3$ of the frame A. This enables the pitch or inclination of the machine to be controlled by the tongue V.

Z is the driver's seat, which is supported from the frame A by suitable supports, and is provided with a foot-rest, in the ordinary manner.

Having thus described my invention,

I claim as new, and desire to secure by Letters Patent—

1. The revolving cylindrical screen K, formed by the combination of the tubular side bars $k^1$, bands or rims $k^2 k^3$, and shaft J, when used in connection with the frame and gearing of a potato-digger, substantially as herein shown and described, and for the purpose set forth.

2. The combination of the buckets $k^5$, with the interior surface of the flanged band or rim $k^3$, at the rear end of the revolving screen K, substantially as herein shown and described, and for the purpose set forth.

3. The combination of the spout or chute L, with the buckets $k^5$, rear end of the revolving screen K, and frame A, substantially as herein shown and described, and for the purpose set forth.

4. The tubular screen, back-head, and loose front head, constructed and arranged together as described, to allow the latter to be slipped back from the revolving cylinder or screen.

5. The arrangement in relation to the other parts of the inside elevator, for the purpose of raising the potatoes in the manner set forth.

6. The arrangement of the adjustable hinge at the back end of the plow, for the purpose of raising or lowering it, to suit the mouth of the revolving screen.

7. The adjustable scraper T, constructed and operating substantially as herein shown and described, in combination with the plow-plate N and frame A, as and for the purpose set forth.

8. The combination of the curved toothed plate X, and key or stop Y, with each other and with the tongue V and frame A, substantially as herein shown and described, and for the purpose set forth.

The above specification of my invention signed by me, this 9th day of April, 1869.

H. M. SMITH.

Witnesses:
E. GREENE COLLINS,
JAMES T. GRAHAM.